United States Patent
Chen et al.

(10) Patent No.: US 12,257,561 B1
(45) Date of Patent: Mar. 25, 2025

(54) EFFICIENT AND ENERGY-SAVING BUILDING SLURRY STIRRING DEVICE

(71) Applicant: Nanjing Kangtai Construction Grouting Tech Co., Ltd, Nanjing (CN)

(72) Inventors: Sensen Chen, Nanjing (CN); Qilun Zhang, Nanjing (CN); Ping Wang, Nanjing (CN); Yanfeng Song, Nanjing (CN); Hui Bao, Nanjing (CN); Tao Jiang, Nanjing (CN); Xiufa Guan, Nanjing (CN); Yufeng Wang, Nanjing (CN); Jie Jiang, Nanjing (CN); Xingyang He, Nanjing (CN); Zhong Wen, Nanjing (CN); Zhuo Wen, Nanjing (CN); Deng Chen, Nanjing (CN); Longxi Li, Nanjing (CN); Gang Luo, Nanjing (CN)

(73) Assignee: Nanjing Kangtai Construction Grouting Tech Co., Ltd, Nanjing (CN)

( * ) Notice: Subject to any disclaimer, the term of this patent is extended or adjusted under 35 U.S.C. 154(b) by 0 days.

(21) Appl. No.: 18/936,375

(22) Filed: Nov. 4, 2024

(30) Foreign Application Priority Data

Mar. 4, 2024 (CN) .......................... 202410242749.0

(51) Int. Cl.
*B28C 7/16* (2006.01)
*B01F 27/091* (2022.01)
(Continued)

(52) U.S. Cl.
CPC ........ *B01F 35/3204* (2022.01); *B01F 27/091* (2022.01); *B01F 27/112* (2022.01);
(Continued)

(58) Field of Classification Search
CPC ...................................................... B28C 7/163
(Continued)

(56) References Cited

U.S. PATENT DOCUMENTS

| 3,231,245 A | * | 1/1966 | Harvey | ................... B28C 9/004 366/51 |
| 5,122,038 A | * | 6/1992 | Malkoski | .................. F04D 7/00 417/313 |

(Continued)

FOREIGN PATENT DOCUMENTS

| CN | 114571603 A | 6/2022 |
| CN | 216732410 U | 6/2022 |

OTHER PUBLICATIONS

CNIPA Office Action, Application No. 202410242749.0, May 12, 2024.

*Primary Examiner* — David L Sorkin
(74) *Attorney, Agent, or Firm* — WCF IP

(57) ABSTRACT

Provided is an efficient and energy-saving building slurry stirring device. The device includes a grouting assembly, which includes a base, a storage tank, a discharge pipe, a grouting pump and a control box. The storage tank is arranged at the top of the base, the discharge pipe is located at one side of the storage tank, the grouting pump is arranged on the discharge pipe, and the control box is fixed to the top of the base. When the fluidity of a grouting material in the storage tank is reduced due to solidification, the stirring assembly can stir the grouting material in the storage tank. Then, the stirring assembly stops stirring the grouting material to save energy. After the grouting is completed, an inner wall of the storage tank can be cleaned by the stirring assembly.

9 Claims, 8 Drawing Sheets

(51) Int. Cl.
  *B01F 27/112*   (2022.01)
  *B01F 27/17*    (2022.01)
  *B01F 27/90*    (2022.01)
  *B01F 35/12*    (2022.01)
  *B01F 35/32*    (2022.01)
  *B01F 35/33*    (2022.01)
  *B28C 5/08*     (2006.01)
  *C04B 40/00*    (2006.01)
  *B01F 101/28*   (2022.01)

(52) U.S. Cl.
  CPC .............. *B01F 27/17* (2022.01); *B01F 27/90* (2022.01); *B01F 35/123* (2022.01); *B01F 35/3212* (2022.01); *B01F 35/33* (2022.01); *B28C 5/0831* (2013.01); *B28C 7/16* (2013.01); *B28C 7/163* (2013.01); *C04B 40/0028* (2013.01); *B01F 2101/28* (2022.01)

(58) Field of Classification Search
  USPC ..................................................... 366/51, 65
  See application file for complete search history.

(56) References Cited

U.S. PATENT DOCUMENTS

| | | | | |
|---|---|---|---|---|
| 6,161,954 A | * | 12/2000 | DeWall | ................ B28C 5/1207 366/252 |
| 6,227,813 B1 | * | 5/2001 | Leimer | ................ E04G 21/202 366/15 |
| 2014/0029372 A1 | * | 1/2014 | Roark, Jr. | ............... B28C 7/064 366/51 |

* cited by examiner

EFFICIENT AND ENERGY-SAVING BUILDING SLURRY STIRRING DEVICE

CROSS-REFERENCE TO RELATED APPLICATION

This patent application claims the benefit and priority of Chinese Patent Application No. 202410242749.0 filed with the China National Intellectual Property Administration on Mar. 4, 2024, the disclosure of which is incorporated by reference herein in its entirety as part of the present application.

TECHNICAL FIELD

The present disclosure relates to the technical field of energy conservation and environmental protection, and in particular to an efficient and energy-saving building slurry stirring device.

BACKGROUND

In the process of building construction, cement slurry needs to be stirred, otherwise solidification may occur. The solidification of the slurry can be delayed by stirring the interior of the slurry tank. The stirring can keep the slurry at a uniform flow state to delay the solidification process, but the continuous stirring of the interior of the slurry tank will waste energy, which is not energy-saving and environmentally friendly. Therefore, in the construction process, the slurry can only be stirred when slightly solidified or its fluidity becomes poor. This not only can ensure that the slurry is free of solidification, but also can achieve the effect of energy conservation. In the prior art, most grouting equipment cannot stir the slurry according to its specific conditions, and after grouting is completed, the inner wall of the slurry tank cannot be cleaned in time, which leads to the residue and accumulation of grouting materials and the waste of slurry.

SUMMARY

In view of the problems in the existing efficient and energy-saving building slurry stirring device, the present disclosure is provided.

Therefore, the problem to be solved by the present disclosure is that in the prior art, most grouting equipment cannot stir the slurry according to its specific conditions, which leads to the residue and accumulation of grouting materials and the waste of slurry.

To solve the technical problem above, the present disclosure provides the following technical solutions: an efficient and energy-saving building slurry stirring device includes a grouting assembly, including a base, a storage tank, a discharge pipe, a grouting pump, and a control box, where the storage tank is arranged at the top of the base, the discharge pipe is located at one side of the storage tank, the grouting pump is arranged on the discharge pipe, and the control box is fixed to the top of the base;

a stirring assembly arranged in the storage tank, where the stirring assembly includes a stirring element, a triggering element, a transmission element and a switching element, where the stirring element is positioned in the storage tank, the triggering element is located on the discharge pipe, the transmission element is positioned in the stirring element, and the switching element is arranged on the stirring element.

As a preferred scheme of the efficient and energy-saving building slurry stirring device provided by the present disclosure, the stirring element includes a rotating post, a stirring sleeve, a stirring rod, a scraping plate, and a motor. The rotating post is rotatably connected into the storage tank, the stirring sleeve is positioned in the rotating post, the stirring rod is inserted into the stirring sleeve, the scraping plate is fixed to one end of the stirring rod, the scraping plate is inclined, and the motor is arranged at the top of the storage tank.

As a preferred scheme of the efficient and energy-saving building slurry stirring device provided by the present disclosure, the triggering element includes a fixed box, a rotating rod, a blade, a movable plate, a first electrode sheet, and a second motor sheet. The fixed box (202a) is fixed to the discharge pipe, the rotating rod is rotatably connected into the fixed box, the blade is fixed to an outer side of the rotating rod, a groove (Z) is formed in the rotating rod, the movable plate is rotatably connected into the groove by a rotating shaft, the first electrode sheet is fixed into the groove, and the second motor sheet is fixed to one side of the movable plate.

As a preferred scheme of the efficient and energy-saving building slurry stirring device provided by the present disclosure, the triggering element further includes a weight, and the weight is fixed to one side of the movable plate.

As a preferred scheme of the efficient and energy-saving building slurry stirring device provided by the present disclosure, the transmission element includes a reciprocating roller, a movable sleeve, and a fixed shaft. The reciprocating roller is rotatably connected into the rotating post, the movable sleeve is located on an outer side of the reciprocating roller, and the fixed shaft is fixed into the movable sleeve.

As a preferred scheme of the efficient and energy-saving building slurry stirring device provided by the present disclosure, the transmission element further includes a baffle (203d), a stabilizing block, a fixed disc, and a friction block. The baffle is positioned in the rotating post, one side of the stabilizing block is fixed to an inner wall of the rotating post, the fixed disc is fixed to the top of the baffle, the friction block is fixed to an outer side of the fixed disc, a positioning groove is formed in the baffle, and the stabilizing block is clamped into the positioning groove.

As a preferred scheme of the efficient and energy-saving building slurry stirring device provided by the present disclosure, the transmission element further includes a threaded post, a gear, a toothed plate, a ratchet wheel, and a pawl. The threaded post is rotatably connected into the stirring sleeve, the gear is rotatably connected into the stirring sleeve, the toothed plate is fixed into the rotating post, the ratchet wheel is fixed to an inner side of the gear, and the pawl is arranged on one side of the threaded post.

As a preferred scheme of the efficient and energy-saving building slurry stirring device provided by the present disclosure, the switching element includes a positioning block, a clamping block, a fixed sleeve, and a toothed block. The positioning block is located on the outer side of the reciprocating roller, and the clamping block is fixed to one side of the positioning block. A clamping groove is formed in the rotating post, the clamping block is clamped into the clamping groove. The fixed sleeve is fixed to the bottom of the positioning block, the toothed block is fixed to the outer side of the reciprocating roller, and a toothed socket corresponding to the toothed block is formed in the positioning block.

As a preferred scheme of the efficient and energy-saving building slurry stirring device provided by the present disclosure, the switching element further includes a positioning sleeve, a connecting block, a support plate, and a cylinder. The positioning sleeve is rotatably connected to an outer side of the fixed sleeve, one side of the connecting block is fixed to the positioning sleeve the support plate is fixed to an outer side of the connecting block, and the cylinder is arranged at the top of the storage tank.

As a preferred scheme of the efficient and energy-saving building slurry stirring device provided by the present disclosure, the switching element further includes a fixed block, a pressing block, a force-bearing block, a first support block, a second support block, and a spring. The fixed block is fixed to the bottom of the fixed sleeve. The pressing block is fixed to the bottom of the fixed block, and the force-bearing block is fixed to the top of the fixed disc. The first support block is fixed to one side of the force-bearing block, one side of the second support block is fixed to an inner wall of the rotating post, and two ends of the spring are fixed to the first support block and the second support block, respectively.

The present disclosure has the beneficial effects that through the arrangement of the stirring assembly, when the fluidity of a grouting material in the storage tank is reduced due to solidification, the stirring assembly can stir the grouting material in the storage tank, thus preventing the grouting material from solidifying, and increasing the flow of the grouting material. Afterwards, the stirring assembly may stop stirring the grouting material to save energy. After the grouting is completed, an inner wall of the storage tank can be cleaned by the stirring assembly, thus avoiding a situation of slurry waste.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
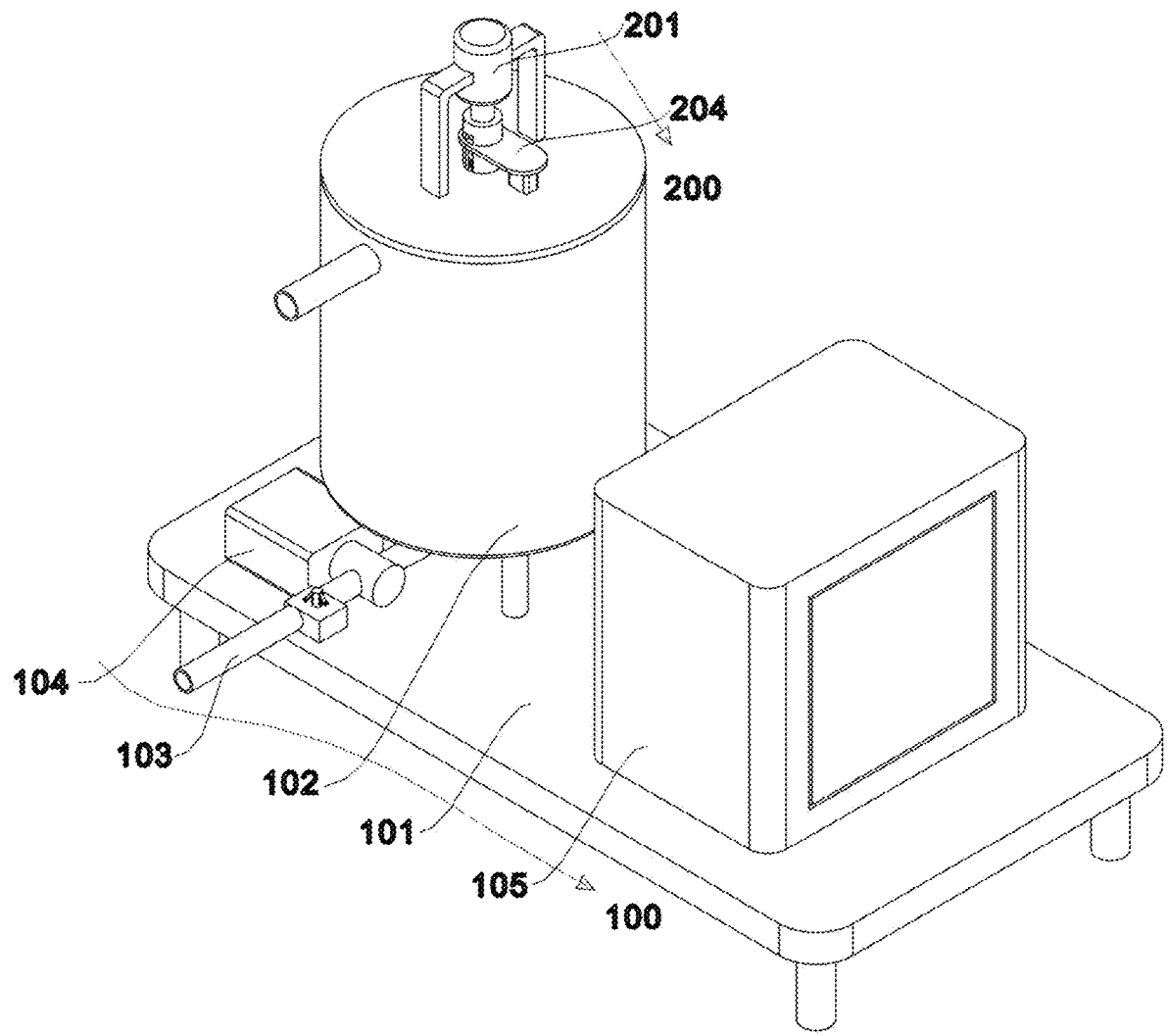
FIG. 1 is an overall diagram of an efficient and energy-saving building slurry stirring device.

In the drawings: 100—grouting assembly; 200—stirring assembly; 101—base; 102—storage tank; 103—discharge pipe; 104—grouting pump; 105—control box; 201—stirring element; 202—triggering element; 203—transmission element; 204—switching element; 201a—rotating post; 201b—stirring sleeve; 201c—stirring rod; 201d—scraping plate; 201e—motor; 202a—fixed box; 202b—rotating rod; 202c—blade; 202d—movable plate; 202e—first electrode sheet; 202f—second motor sheet; Z—groove; 202g—weight; 203a—reciprocating roller; 203b—movable sleeve; 203c—fixed shaft; 203d—baffle; 203e—stabilizing block; 203f—fixed disc; 203g—friction block; M—positioning groove; 203h—threaded post; 203i—gear; 203j—toothed plate; 203k—ratchet wheel; 203l—pawl; 204a—positioning block; 204b—clamping block; 204f—fixed sleeve; 204g—toothed block; X—clamping groove; V—toothed socket; 204h—positioning sleeve; 204i—connecting block; 204j—support plate; 204k—cylinder; 204l—fixed block; 204m—pressing block; 204n—force-bearing block; 204o—first support block; 204p—second support block; 204q—spring.

DETAILED DESCRIPTION OF THE EMBODIMENTS

In order to make the objectives, features and advantages of the present disclosure more clearly, the present disclosure is further described in detail below with reference to the accompanying drawings of this specification.

Many specific details are set forth in the following description to provide a thorough understanding of the present disclosure. However, the present disclosure can be implemented in a variety of manners different from those described herein, and it may be similarly generalized by those skilled in the art without departing from the concept of the present disclosure. Therefore, the present disclosure is not limited to the specific embodiments disclosed below.

Secondly, "one embodiment" or "an embodiment" here refers to a specific feature, structure or characteristic that can be included in at least one implementation of the present disclosure. The appearances of "in one embodiment" in different places in the specification do not all referring to the same embodiment, nor separate or selective embodiments mutually exclusive with other embodiments.

Embodiment 1

Figure 2:
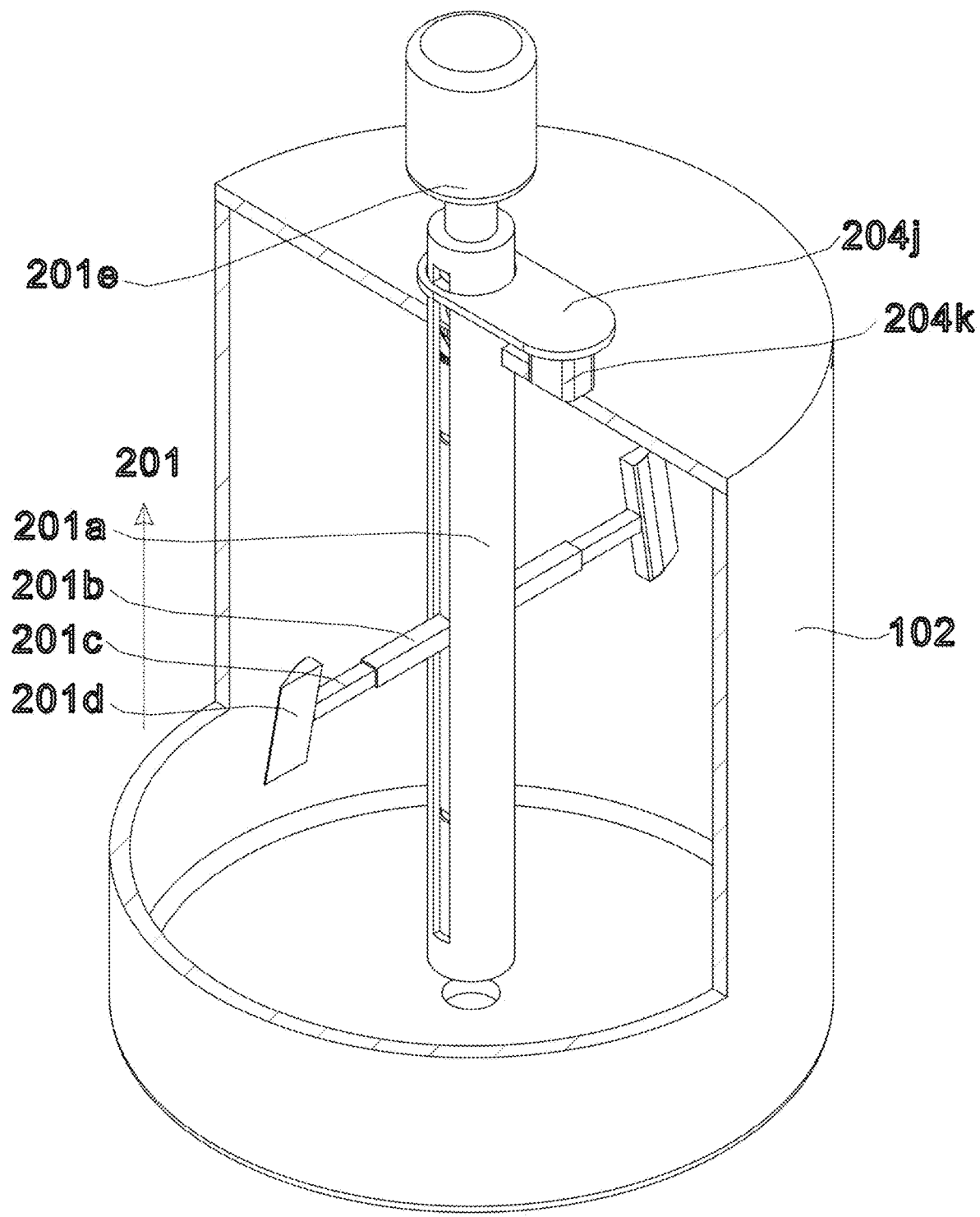
FIG. 2 is a sectional structure diagram of a storage tank of an efficient and energy-saving building slurry stirring device.
Figure 3:
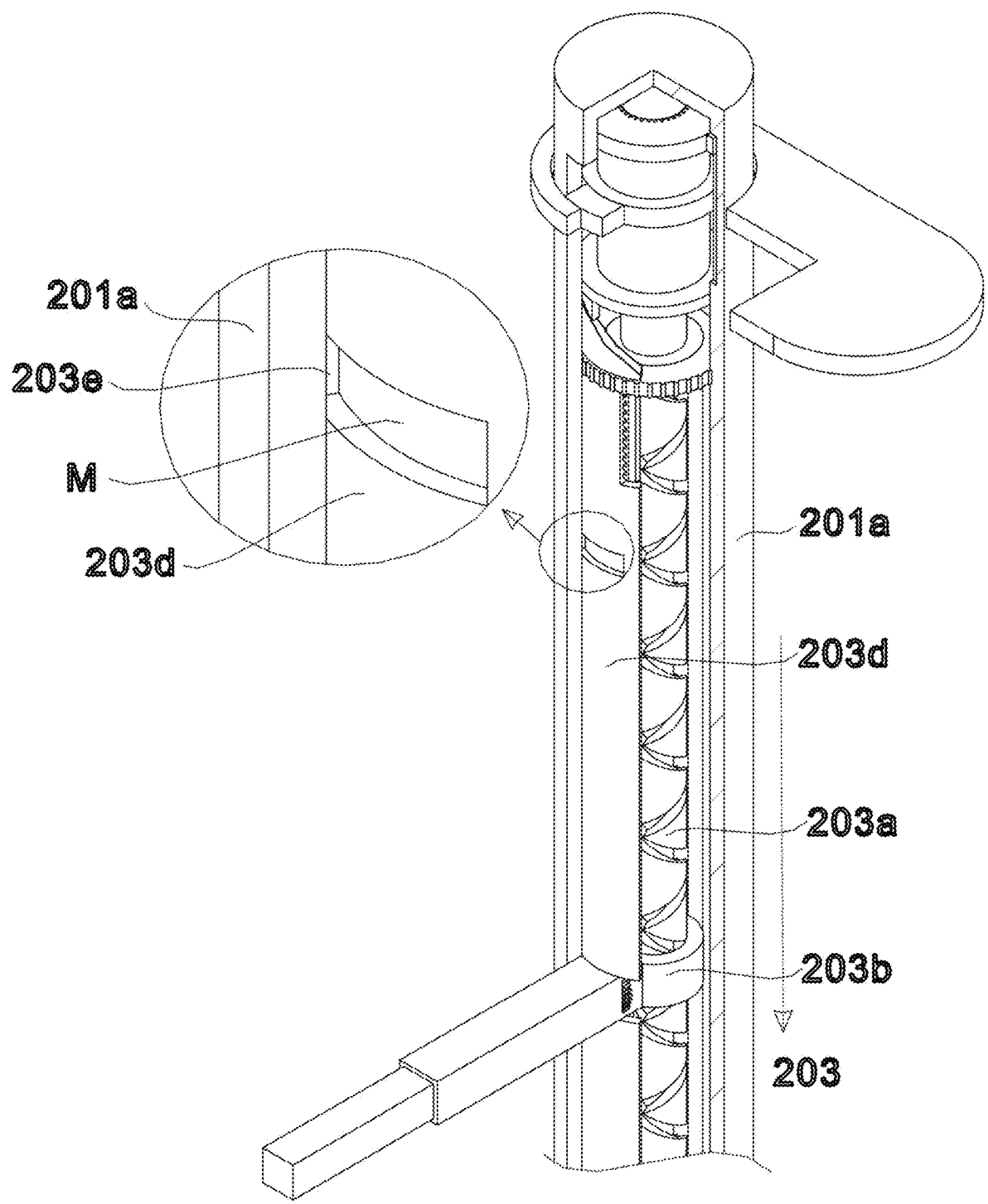
FIG. 3 is a partial sectional structure diagram of a rotating post of an efficient and energy-saving building slurry stirring device.
Figure 4:
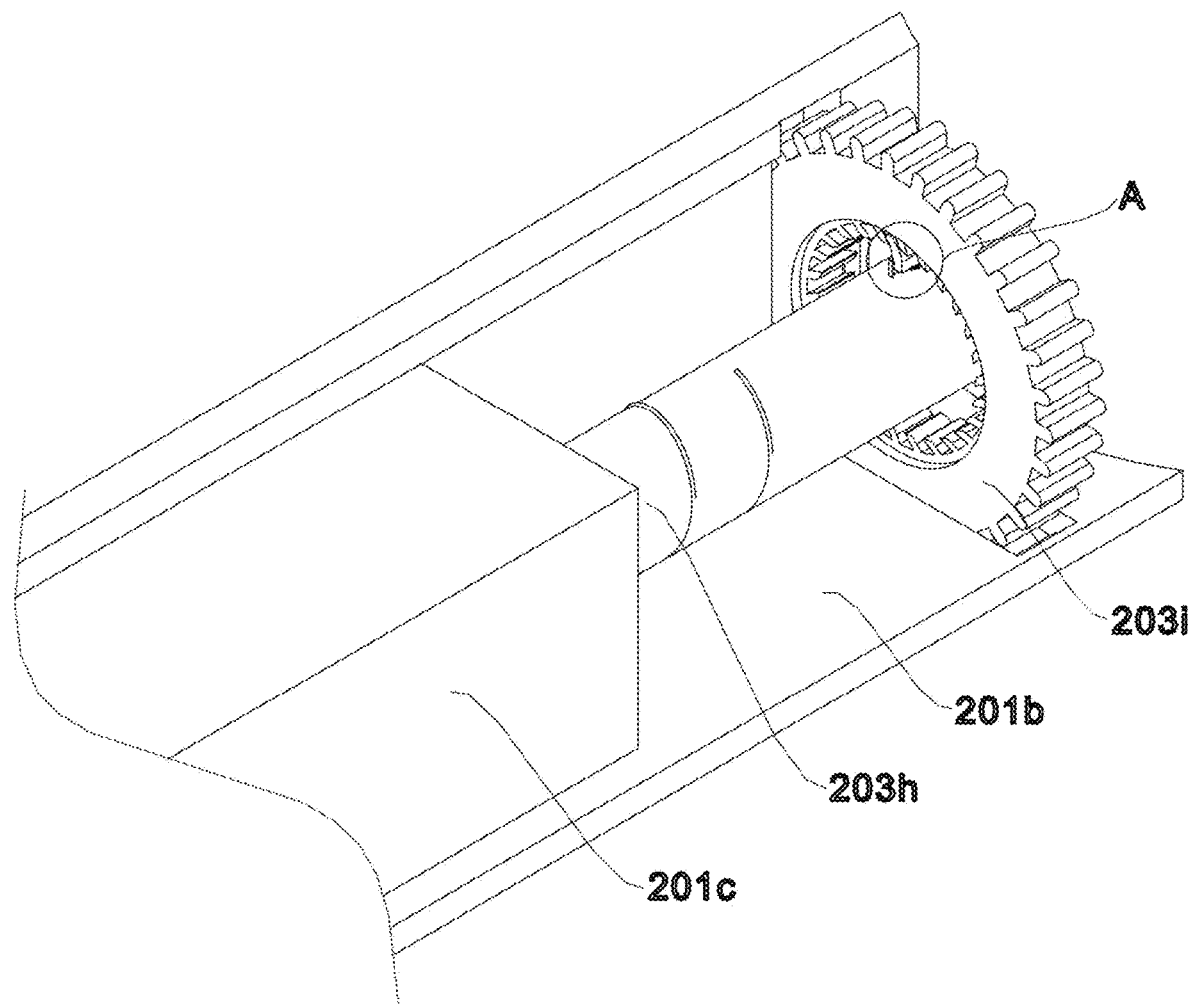
FIG. 4 is a partial sectional structure diagram of a stirring sleeve of an efficient and energy-saving building slurry stirring device.
Figure 5:
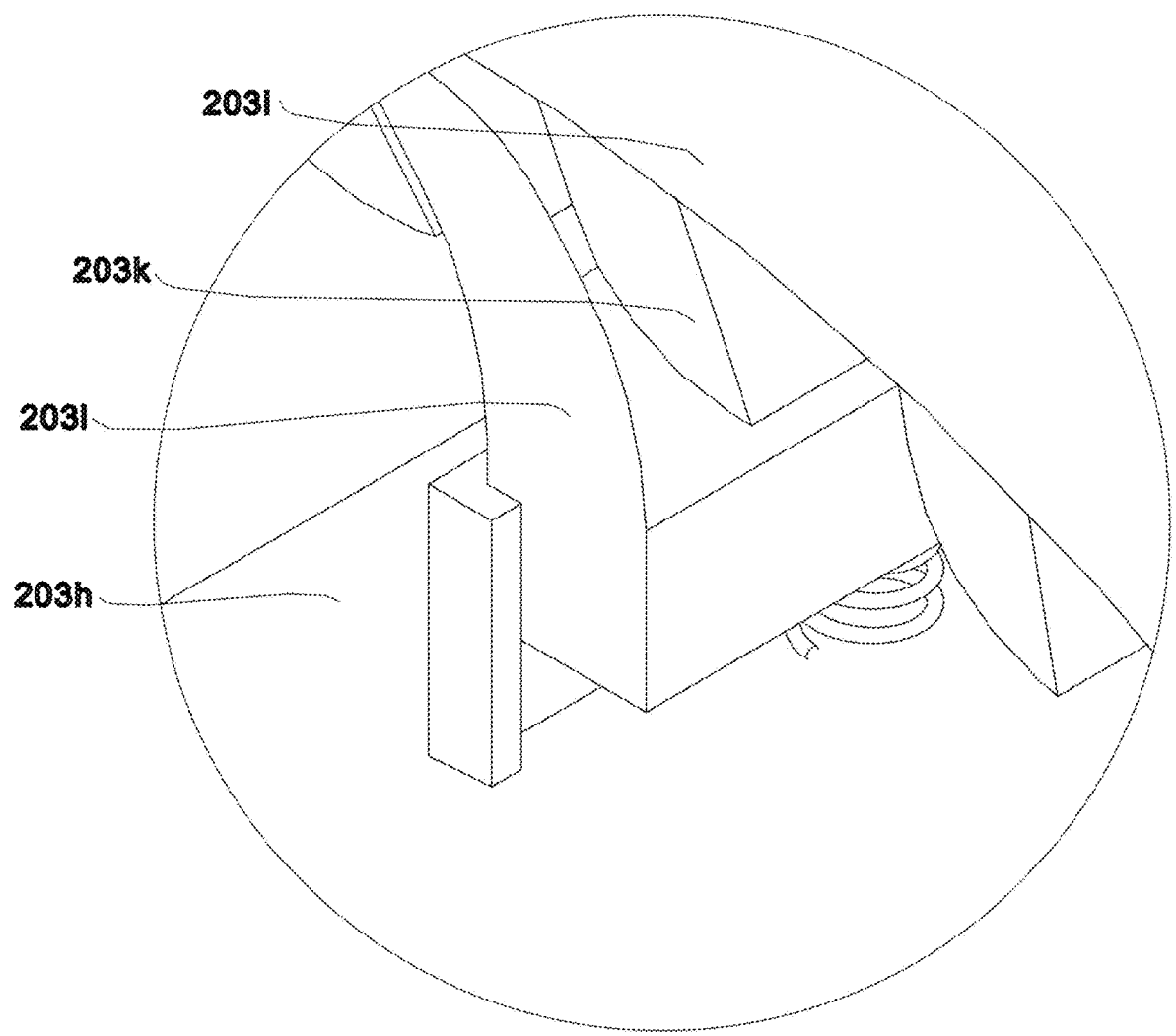
FIG. 5 is a partial enlarged structure diagram of part A in FIG. 5 of an efficient and energy-saving building slurry stirring device.
Figure 6:
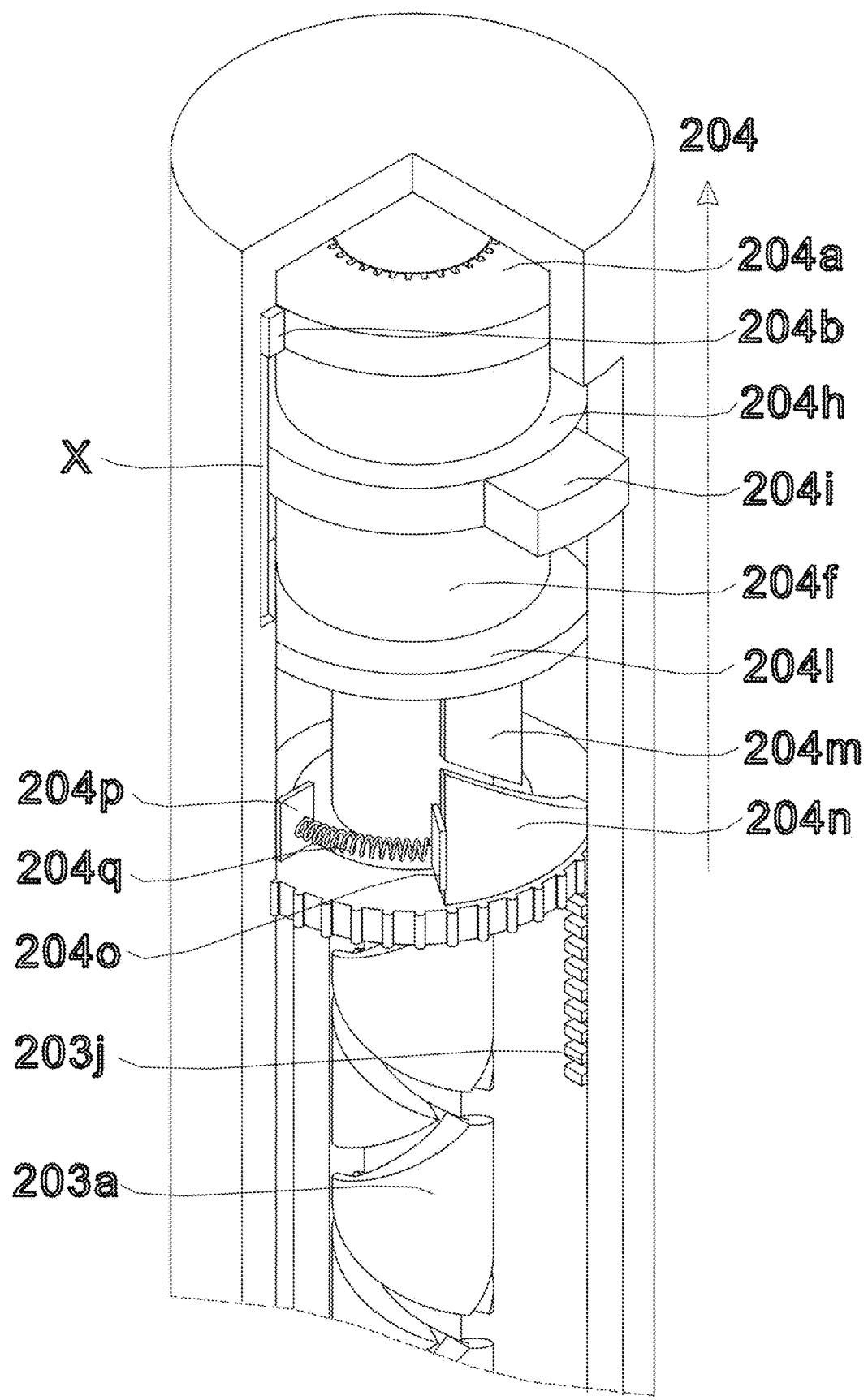
FIG. 6 is a partial sectional structure diagram of a rotating post of an efficient and energy-saving building slurry stirring device.
Figure 7:
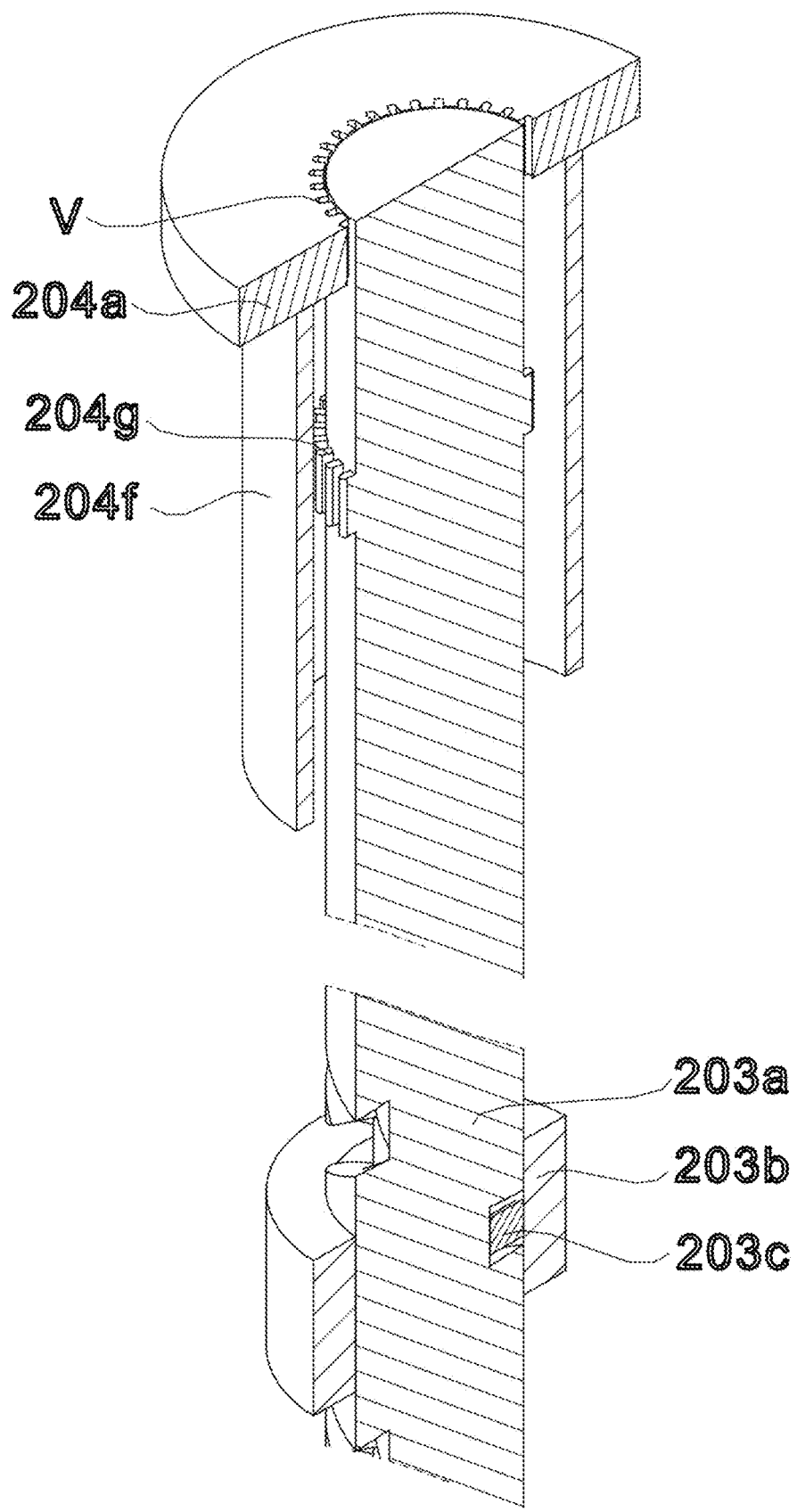
FIG. 7 is a sectional structure diagram of a fixed sleeve of an efficient and energy-saving building slurry stirring device.
Figure 8:
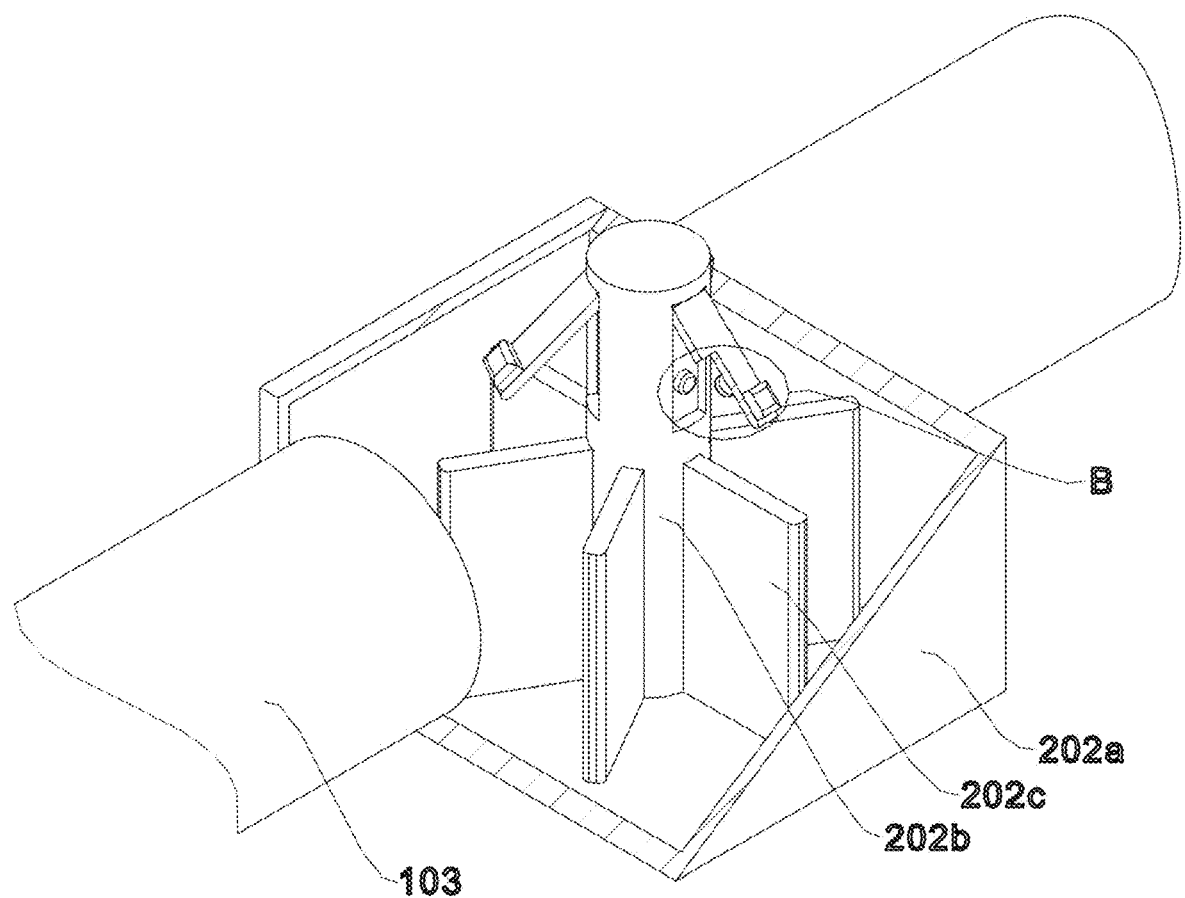
FIG. 8 is a sectional structure diagram of a fixed box of an efficient and energy-saving building slurry stirring device.
Figure 9:
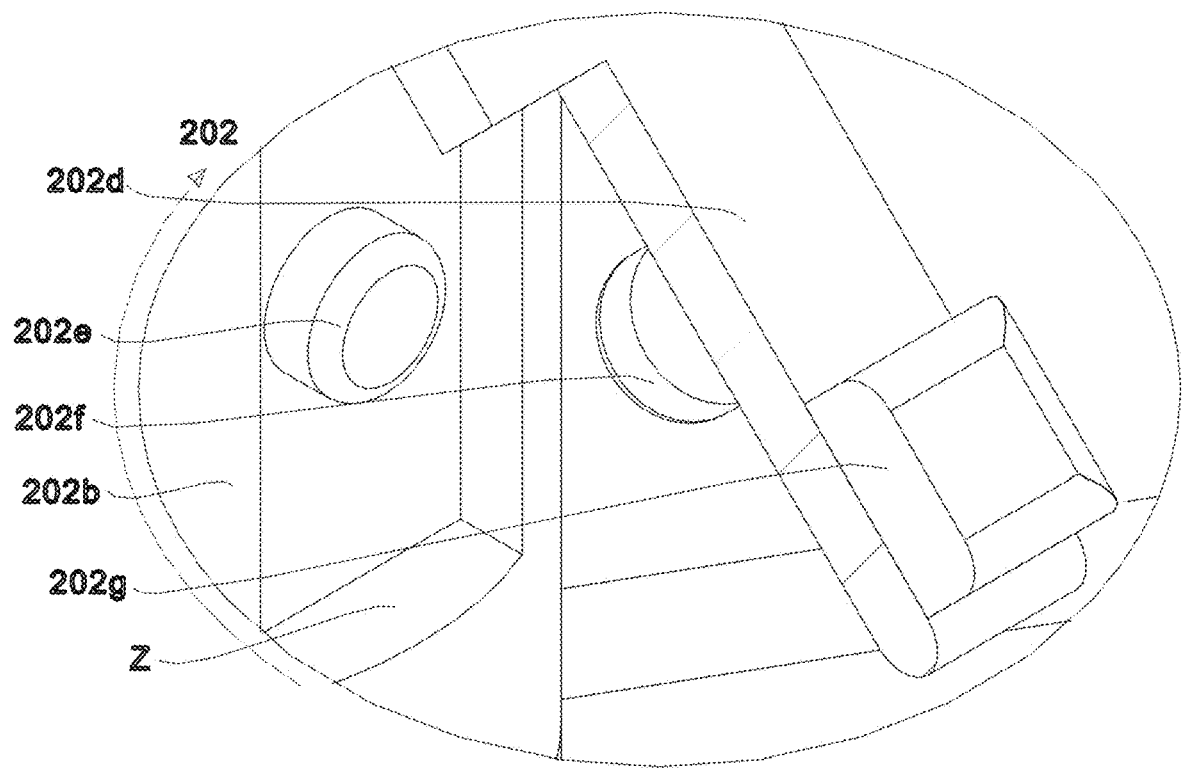
FIG. 9 is a partial enlarged structure diagram of part B in FIG. 8 of an efficient and energy-saving building slurry stirring device.

FIGS. 1 to 9 refer to a first embodiment of the present disclosure, which provides an efficient and energy-saving building slurry stirring device. The efficient and energy-saving building slurry stirring device includes a grouting assembly 100, and a stirring assembly 200, which can be coupled with each other to prevent a grouting material from solidifying in the use process.

The grouting assembly includes a base 101, a storage tank 102, a discharge pipe 103, a grouting pump 104, and a control box 105. The storage tank 102 is arranged at the top of the base 101, the discharge pipe 103 is located at one side of the storage tank 102, the grouting pump 104 is arranged on the discharge pipe 103, and the control box 105 is fixed to the top of the base 101.

The storage tank 102 is used to store the grouting material, the discharge pipe 103 is used to discharge the grouting material, the grouting pump 104 is connected to the discharge pipe 103 for conveying the slurry, and the control box 105 is configured to control the grouting pump 104. This is the prior art and thus will not be described in detail in this scheme.

The stirring assembly 200 is arranged in the storage tank 102. The stirring assembly includes a stirring element 201, a triggering element 202, a transmission element 203, and a switching element 204. The stirring element 201 is positioned in the storage tank 102, the triggering element 202 is located on the discharge pipe 103, the transmission element 203 is positioned in the stirring element 201, and the switching element 204 is arranged on the stirring element 201.

Through the arrangement of the stirring element 201, when the grouting material in the storage tank 102 solidifies, the fluidity of the slurry is reduced, and then the flow velocity of the slurry inside the discharge pipe 103 is reduced. In this case, the stirring element 201 is started by the triggering element 202, and thus the grouting material inside the storage tank 102 can be stirred by the stirring element 201, which can delay the solidification of the grouting material and increase the fluidity of the grouting material. When the flow velocity of the slurry inside the discharge pipe 103 increases, the triggering element 202 may stop the stirring element 201 for energy saving. When the grouting material in the storage tank 102 is discharged after grouting is completed, the transmission element 203 is driven by the switching element 204 to move, and the stirring element 201 is driven by the transmission element 203 to move up and down; and meanwhile, the stirring element 201 is enabled to make contact with the inner wall of the storage tank 102. When the stirring element 201 moves downwards during the rotation, the grouting material remaining on the inner wall of the storage tank 102 can be cleaned, so as to avoid a situation of slurry waste.

Embodiment 2

FIGS. 1 to 9 refer to a second embodiment of the present disclosure, which is based on the above embodiment.

The stirring element 201 includes a rotating post 201a, a stirring sleeve 201b, a stirring rod 201c, a scraping plate 201d, and a motor 201e. The rotating post 201a is rotatably connected into the storage tank 102, the stirring sleeve 201b is positioned in the rotating post 201a, the stirring rod 201c is inserted into the stirring sleeve 210b, the scraping plate 201d is fixed to one end of the stirring rod 210c, the scraping plate 201d is inclined, and the motor 201e is arranged at the top of the storage tank 102.

An output shaft of the motor 201e is fixed to the rotating post 201a, and the motor 201e is fixed to the top of the storage tank 102 via a bracket. There are two stirring sleeves 201, two stirring rods 201c and two scraping plates 201d, which each are located on both sides of the rotating post 201a, respectively. The stirring rod 201c is movably connected into the stirring sleeve 201b.

When the motor 201e is started, the rotating post 201a can be driven to rotate, and the stirring sleeve 201b, the stirring rod 201c and the scraping plate 201d are driven by the rotating post 201a to rotate, thus stirring the grouting material in the storage tank 102, so as to delay the solidification of the grouting material. When the stirring rod 201c moves towards the outer side of the stirring sleeve 201b, and drives the scraping plate 201d to be attached to an inner wall of the storage tank 102, the rotation of the rotating post 201a may drive the scraping plate 201d to move up and down and rotate on the inner wall of the storage tank 102, thus cleaning the slurry remaining on the inner wall of the storage tank 102.

Specifically, the triggering element 202 includes a fixed box 202a, a rotating rod 202b, a blade 202c, a movable plate 202d, a first electrode sheet 202e, and a second motor sheet 202f. The fixed box 202a is fixed to the discharge pipe 103, the rotating rod 202b is rotatably connected into the fixed box 202a, the blade 202c is fixed to an outer side of the rotating rod 202b, a groove Z is formed in the rotating rod 202b, the movable plate 202d is rotatably connected into the groove Z by a rotating shaft, the first electrode sheet 202e is fixed into the groove Z, and the second motor sheet 202f is fixed to one side of the movable plate 202d.

Multiple movable plates 202d are annularly and uniformly arranged on the outer side of the rotating rod 202b. Both sides of the fixed box 202a communicate with the discharge pipe 103, the rotating rod 202b penetrates to the outer side of the fixed box 202a, and is movably connected to the fixed box 202a. When the first electrode sheet 202e is in contact with the second motor sheet 202f, the motor 201e can be started. When the first electrode sheet 202e is separated from the second motor sheet 202f, the motor 201e can be stopped.

When the slurry in the discharge pipe 103 enters the fixed box 202a, the slurry may push the blade 202c to rotate, and the rotating rod 202b is driven by the blade 202c to rotate. When the rotating rod 202b rotates, the movable plate 202d will be lifted upward under the action of a centrifugal force, thus separating the first electrode sheet 202e from the second motor sheet 202f. When the grouting material in the storage tank 102 solidifies, the flow velocity of the slurry in the discharge pipe 103 is reduced, and then the rotating speed of the rotating rod 202a is reduced, leading to the decrease of the centrifugal force generated. In this case, the movable plate 202d may fall downwards, and the first electrode sheet 202e is enabled to make contact with the second motor sheet 202f to start the motor 201e, thus stirring the grouting material in the storage tank 102.

Specifically, the triggering element 202 further includes a weight 202g, and the weight 202g is fixed to one side of the movable plate 202d.

The number of the weights 202g is equal to that of the movable plates 202d, and the weight of the movable plate 202d is increased by the weight 202g. When the centrifugal force generated by the rotating rod 202b is reduced, the movable plate 202d may fall downwards.

Specifically, the transmission element 203 includes a reciprocating roller 203a, a movable sleeve 203b, and a fixed shaft 203c. The reciprocating roller 203a is rotatably connected into the rotating post 201a, the movable sleeve 203b is located on the outer side of the reciprocating roller 203a, and the fixed shaft 203c is fixed into the movable sleeve 203b.

The fixed shaft 203c is internally meshed with the reciprocating roller 203a, one side of the stirring sleeve 201b is fixed to the movable sleeve 203b, a through groove is formed in the rotating post 201a, and the stirring sleeve 201b is movably connected into the through groove. When the reciprocating roller 203a rotates, the movable sleeve 203b can be driven to move upwards, and the stirring sleeve 201b is driven by the movable sleeve 203b to move upwards. When the stirring sleeve 201b moves to an upper end of the rotating post 201a, the stirring rod 201c can drive the scraping plate 201d to extend outwards, and enables the scraping plate 201d to make contact with the inner wall of the storage tank 102. When the scraping plate 201d rotates and moves downwards, the slurry remaining on the inner wall of the storage tank 102 can be cleaned.

Specifically, the transmission element 203 further includes a baffle 203d, a stabilizing block 203e, a fixed disc 203f, and a friction block 203g. The baffle 203d is positioned in the rotating post 201a, one side of the stabilizing block 203e is fixed to an inner wall of the rotating post 201a, the fixed disc 203f is fixed to the top of the baffle 203d, the friction block 203g is fixed to an outer side of the fixed disc 203f, a positioning groove M is formed in the baffle 203d, and the stabilizing block 203e is clamped into the positioning groove M.

Two baffles 203d are located on two sides inside the rotating post 201a, respectively. Each baffle 203d is arc-shaped and attached to the inner wall of the rotating post 201a. A clamping groove is formed in the baffle 203d, and the stirring sleeve 201b is positioned in the clamping groove. The baffle 203d is used to block the through groove on the rotating post 201a, thus avoiding a situation that the internal parts cannot move due to the fact that the grouting material in the storage tank 201 enters the rotating post 201a. The fixed disc 203f is used to connect the baffle 203d, the stabilizing block 203e and the positioning groove M are in coupling to support and position the baffle 203d. A friction groove corresponding to the friction block 203g is formed in the rotating post 201a, the friction block 203g is coupled with the friction groove to connect the fixed disc 203f to the rotating post 201a, such that the baffle 203d can rotate with the rotating post 201a, and continues to block the through groove on the rotating post 201a. When the fixed disc 203f rotates towards one side, the baffle 203d is driven to be separated from the through groove, and the stirring groove 201b is driven to be separated from the clamping groove, thus enabling the movable sleeve 203b to drive the stirring sleeve 201b to move up and down.

Embodiment 3

FIGS. 1 to 9 refer to a third embodiment of the present disclosure, which is based on the above two embodiments.

Specifically, the transmission element 203 further includes a threaded post 203h, a gear 203i, a toothed plate 203j, a ratchet wheel 203k, and a pawl 203l. The threaded post 203h is rotatably connected into the stirring sleeve 201b, the gear 203i is rotatably connected into the stirring sleeve 201b, the toothed plate 203j is fixed into the rotating post 201a, the ratchet wheel 203k is fixed to an inner side of the gear 203i, and the pawl 203l is arranged on one side of the threaded post 203h.

The ratchet wheel 203k is meshed with the pawl 203l, a threaded hole is formed in the stirring rod 201c, and the threaded post 203h is threaded into the threaded hole. A guide frame is fixed to the threaded post 203h, the ratchet wheel 203l is movably connected into the guide frame, and another spring is fixed to the bottom of the pawl 203l. The toothed plate 203j is located at an upper end in the rotating post 201a. When the stirring sleeve 201b moves upwards to the upper end of the rotating rod 201a, the gear 203i is meshed with the toothed plate 203j, the gear 203i is driven by the toothed plate 203j to rotate, and the threaded post 203h is driven by the gear 203i to rotate. The threaded post 203h can drive the stirring rod 201c to move through the cooperation of the threaded hole, thus enabling the stirring rod 201c to drive the scraping plate 201d to be attached to the inner wall of the storage tank 102. When the stirring sleeve 201b moves downwards, the inner wall of the storage tank 102 can be cleaned by the scraping plate 201d. Through the cooperation of the ratchet wheel 203k and the pawl 203l, the threaded post 203h is free of rotating reversely, and then the scraping plate 201d can be continuously attached to the inner wall of the storage tank 102.

Specifically, the switching element 204 further includes a positioning block 204a, a clamping block 204b, a fixed sleeve 204f, and a toothed block 204g. The positioning block 204a is located on the outer side of the reciprocating roller 203a, and the clamping block 204b is fixed to one side of the positioning block 204a. A clamping groove X is formed in the rotating post 201a, and the clamping block 204b is clamped into the clamping groove X. The fixed sleeve 204f is fixed to the bottom of the positioning block 204a, the toothed block 204g is fixed to the outer side of the reciprocating roller 203a, and a toothed socket V corresponding to the toothed block 204g is formed in the positioning block 204a.

The positioning block 204a is connected to the rotating post 201a through the cooperation of the clamping block 204b and the clamping groove X, such that the rotating post 201a can drive the positioning block 204a to rotate when rotating. When the positioning block 204a moves downwards, the toothed block 204g is meshed with the toothed socket V. At this time, the coupling of the toothed block 204g and the toothed socket V can enable the rotating post 201a to drive the reciprocating roller 201a to rotate, and thus the reciprocating roller 203a can drive the movable sleeve 203b to move up and down.

Specifically, the switching element 204 further includes a positioning sleeve 204h, a connecting block 204i, a support plate 204j, and a cylinder 204k. The positioning sleeve 204h is rotatably connected to an outer side of the fixed sleeve 204f, one side of the connecting block 204i is fixed to the positioning sleeve 204h, the support plate 204j is fixed to an outer side of the connecting block 204i, and the cylinder 204k is arranged at the top of the storage tank 102.

The positioning sleeve 204h is rotatably connected to the outer side of the fixed sleeve 204f via a bearing. When the cylinder 204k is started, the support plate 204j and the connecting block 204i can be driven to move downwards. The positioning sleeve 204h and the fixed sleeve 204f are driven by the connecting block 204i to move downwards, thus enabling the fixed sleeve 204f to drive the positioning block 204a to move downwards.

Specifically, the switching element 204 further includes a fixed block 204l, a pressing block 204m, a force-bearing block 204n, a first support block 204o, a second support block 204p, and a spring 204q. The fixed block 204l is fixed to the bottom of the fixed sleeve 204f. The pressing block 204m is fixed to the bottom of the fixed block 204l, the force-bearing block 204n is fixed to the top of the fixed disc 203f. The first support block 204o is fixed to one side of the force-bearing block 204n, one side of the second support block 204p is fixed to an inner wall of the rotating post 201a, and two ends of the spring 204q are fixed to the first support block 204o and the second support block 204p, respectively.

One side of the force-bearing block 204n is inclined. The fixed sleeve 204f can drive the fixed block 204l and the pressing block 204m to move downward when moving downwards, which makes the pressing block 204m press the inclined surface of the force-bearing block 204n. Through the cooperation of the pressing block and the force-bearing block, the fixed disc 203f can be pushed to rotate, and then the baffle 203d can be driven by the fixed disc 203f to rotate. When the pressing block 204 m is separated from the force-bearing block 204n, the first support block 204o and the force-bearing block 204n can be pushed by the spring 204q to move, thus resetting the fixed disc 203f and the baffle 203d.

During use, the grouting pump 104 is started, and the grouting material in the storage tank 102 is conveyed through the grouting pump 104 and the discharge pipe 103. When the slurry in the discharge pipe 103 enters the fixed box 202a, the slurry may push the blade 202c to rotate, and the rotating rod 202b is driven by the blade 202c to rotate. When the rotating rod 202b rotates, the movable plate 202d will be lifted upward under the action of a centrifugal force, thus separating the first electrode sheet 202e from the second motor sheet 202f. When the grouting material in the storage tank 102 solidifies, the flow velocity of the slurry in the discharge pipe 103 is reduced, and then the rotating speed of the rotating rod 202a is reduced, leading to the decrease of the centrifugal force generated. In this case, the movable plate 202d may fall downwards, and the first electrode sheet 202e is enabled to make contact with the second motor sheet 202f to start the motor 201e. When the motor 201e is started, the rotating post 201a can be driven to rotate, the stirring sleeve 201b, the stirring rod 201c and the scraping plate 201d are driven by the rotating post 201a to rotate, such that the grouting material in the storage tank 102 can be stirred to delay the solidification of the grouting material and increase the fluidity of the slurry. When the flow velocity of the slurry in the discharge pipe 103 is restored, the centrifugal force generated by the rotating rod 202b increases, and then the motor 201e can be stopped for energy saving.

After the grouting is completed, when the grouting material in the storage tank 102 is completely discharged, the cylinder 204k is started to drive the support plate 204j and the connecting block 204i to move downwards, and the positioning sleeve 204h and the fixed sleeve 204f are driven by the connecting block 204i to move downwards. When the fixed sleeve 204f moves downwards, the fixed block 204l and the pressing block 204m can be driven to move downwards at the same time, which enables the pressing block 204m to press the inclined surface of the force-bearing block 204n. Through the cooperation of the pressing block 204m and the force-bearing block 204n, the fixed disc 203f can be pushed to rotate, then the baffle 203d is driven by the fixed disc 203f to rotate, and the baffle 203d is driven to be separated from the through groove, thus enabling the stirring sleeve 201b to be separated from the clamping groove. Meanwhile, the fixed sleeve 204f may drive the positioning block 204a to move downwards to make the toothed block 204g meshed with the toothed socket V. Through the cooperation of the toothed block 204g and the toothed socket V, the reciprocating roller 203a can be driven by the rotating post 201a to rotate.

When the reciprocating roller 203a rotates, the movable sleeve 203b can be driven to move upwards, and the stirring sleeve 201b can be driven by the movable sleeve 203b to move upwards. When the stirring sleeve 201b moves to the upper end of the rotating post 201a, the gear 203i is meshed with the toothed plate 203j, and the gear 203i is driven by the toothed plate 203j to rotate. The threaded post 203h is driven by the gear 203i to rotate, the stirring rod 201c is driven by the threaded post 203h to move through the cooperation of the threaded hole, such that the scraping plate 201d can be driven by the stirring rod 201c to attach to the inner wall of the storage tank 102. When the scraping plate 201d rotates and moves downwards, the slurry remaining on the inner wall of the storage tank 102 can be cleaned, thereby avoiding a situation of slurry waste.

It should be noted that the above embodiments are only used to illustrate the technical solution of the present disclosure rather than limiting. Although the present disclosure has been described in detail with reference to the foregoing embodiments, Those of ordinary skill in the art should understand that the technical solutions of the present disclosure can be modified or replaced by equivalents without departing from the spirit and scope of the technical solution of the present disclosure, which should be included in the scope of the claims of the present disclosure.

What is claimed is:
1. An efficient and energy-saving building slurry stirring device, comprising
  a grouting assembly comprising a base (101), a storage tank (102), a discharge pipe (103), a grouting pump (104) and a control box (105), wherein the storage tank (102) is arranged at a top of the base (101), the discharge pipe (103) is located at one side of the storage tank (102), the grouting pump (104) is arranged on the discharge pipe (103), and the control box (105) is fixed to the top of the base (101); and
  a stirring assembly (200) arranged in the storage tank (102), and comprising a stirring element (201), a triggering element (202), a transmission element (203) and a switching element (204), wherein the stirring element (201) is positioned in the storage tank (102), the triggering element (202) is located on the discharge pipe (103), the transmission element (203) is positioned in the stirring element (201), and the switching element (204) is arranged on the stirring element (201);
  wherein the stirring element (201) comprises a rotating post (201a), a stirring sleeve (201b), a stirring rod (201c), a scraping plate (201d), and a motor (201e); the rotating post (201a) is rotatably connected into the storage tank (102), the stirring sleeve (201b) is positioned in the rotating post (201a), the stirring rod (201c) is inserted into the stirring sleeve (210b), the scraping plate (201d) is fixed to one end of the stirring rod (210c), the scraping plate (201d) is inclined, and the motor (201e) is arranged at a top of the storage tank (102); and
  wherein the triggering element (202) comprises a fixed box (202a), a rotating rod (202b), a blade (202c), a movable plate (202d), a first electrode sheet (202e), and a second motor sheet (202f); the fixed box (202a) is fixed to the discharge pipe (103), the rotating rod (202b) is rotatably connected into the fixed box (202a), the blade (202c) is fixed to an outer side of the rotating rod (202b), a groove (Z) is formed in the rotating rod (202b), the movable plate (202d) is rotatably connected into the groove (Z) by a rotating shaft, the first electrode sheet (202e) is fixed into the groove (Z), and the second motor sheet (202f) is fixed to one side of the movable plate (202d).

2. The efficient and energy-saving building slurry stirring device according to claim 1, wherein the triggering element further comprises a weight (202g) fixed to one side of the movable plate (202d).

3. The efficient and energy-saving building slurry stirring device according to claim 1, wherein the transmission element (203) comprises a reciprocating roller (203a), a movable sleeve (203b), and a fixed shaft (203c); the reciprocating roller (203a) is rotatably connected into the rotating post (201a), the movable sleeve (203b) is located on an outer side of the reciprocating roller (203a), and the fixed shaft (203c) is fixed into the movable sleeve (203b).

4. The efficient and energy-saving building slurry stirring device according to claim 3, wherein the transmission element (203) further comprises a baffle (203d), a stabilizing block (203e), a fixed disc (203f), and a friction block (203g); the baffle (203d) is positioned in the rotating post (201a), one side of the stabilizing block (203e) is fixed to an inner wall of the rotating post (201a), the fixed disc (203f) is fixed to a top of the baffle (203d), the friction block (203g) is fixed to an outer side of the fixed disc (203f), a positioning groove (M) is formed in the baffle (203d), and the stabilizing block (203e) is clamped into the positioning groove (M).

5. The efficient and energy-saving building slurry stirring device according to claim 4, wherein the transmission element (203) further comprises a threaded post (203h), a gear (203i), a toothed plate (203j), a ratchet wheel (203k), and a pawl (203l); the threaded post (203h) is rotatably connected into the stirring sleeve (201b), the gear (203i) is rotatably connected into the stirring sleeve (201b), the toothed plate (203j) is fixed into the rotating post (201a), the ratchet wheel (203k) is fixed to an inner side of the gear (203i), and the pawl (203l) is arranged on one side of the threaded post (203h).

6. The efficient and energy-saving building slurry stirring device according to claim 5, wherein the switching element (204) comprises a positioning block (204a), a clamping block (204b), a fixed sleeve (204f), and a toothed block (204g); the positioning block (204a) is located on the outer side of the reciprocating roller (203a), and the clamping block (204b) is fixed to one side of the positioning block (204a); a clamping groove (X) is formed in the rotating post (201a), the clamping block (204b) is clamped into the clamping groove (X); the fixed sleeve (204f) is fixed to a bottom of the positioning block (204a), the toothed block (204g) is fixed to the outer side of the reciprocating roller (203a), and a toothed socket (V) corresponding to the toothed block (204g) is formed in the positioning block (204a).

7. The efficient and energy-saving building slurry stirring device according to claim 6, wherein the switching element (204) further comprises a positioning sleeve (204h), a connecting block (204i), a support plate (204j), and a cylinder (204k); the positioning sleeve (204h) is rotatably connected to an outer side of the fixed sleeve (204f), one side of the connecting block (204i) is fixed to the positioning sleeve (204h), the support plate (204j) is fixed to an outer side of the connecting block (204i), and the cylinder (204k) is arranged at the top of the storage tank (102).

8. The efficient and energy-saving building slurry stirring device according to claim 7, wherein the switching element (204) further comprises a fixed block (204l), a pressing block (204m), a force-bearing block (204n), a first support block (204o), a second support block (204p), and a spring (204q); the fixed block (204l) is fixed to a bottom of the fixed sleeve (204f); the pressing block (204m) is fixed to a bottom of the fixed block (204l), the force-bearing block (204n) is fixed to a top of the fixed disc (203f); the first support block (204o) is fixed to one side of the force-bearing block (204n), one side of the second support block (204p) is fixed to an inner wall of the rotating post (201a), and two ends of the spring (204q) are fixed to the first support block (204o) and the second support block (204p), respectively.

9. The efficient and energy-saving building slurry stirring device according to claim 2, wherein the transmission element (203) comprises a reciprocating roller (203a), a movable sleeve (203b), and a fixed shaft (203c); the reciprocating roller (203a) is rotatably connected into the rotating post (201a), the movable sleeve (203b) is located on an outer side of the reciprocating roller (203a), and the fixed shaft (203c) is fixed into the movable sleeve (203b).

* * * * *